(12) United States Patent
Khan et al.

(10) Patent No.: US 9,998,291 B1
(45) Date of Patent: Jun. 12, 2018

(54) MULTICAST ROUTING BASED ON A UNICAST TRANSPORT NETWORK

(71) Applicant: vIPtela Inc., San Jose, CA (US)

(72) Inventors: Atif Khan, San Jose, CA (US); Venugopal Hemige, San Ramon, CA (US); Rameshbabu Prabagaran, Los Gatos, CA (US)

( * ) Notice: Subject to any disclaimer, the term of this patent is extended or adjusted under 35 U.S.C. 154(b) by 0 days. days.

(21) Appl. No.: 13/789,618

(22) Filed: Mar. 7, 2013

Related U.S. Application Data

(60) Provisional application No. 61/731,430, filed on Nov. 29, 2012.

(51) Int. Cl.
*H04L 12/28* (2006.01)
*H04L 12/56* (2006.01)
*H04L 12/18* (2006.01)

(52) U.S. Cl.
CPC .................................. *H04L 12/18* (2013.01)

(58) Field of Classification Search
CPC ............................. H04L 12/56; H04L 12/28
USPC ........................................................ 370/390
See application file for complete search history.

(56) References Cited

U.S. PATENT DOCUMENTS

| 7,106,735 | B2 * | 9/2006 | Yagyu ................ H04L 12/1836 370/390 |
| 7,756,072 | B1 * | 7/2010 | Fenner ................ H04L 12/1886 370/256 |
| 7,912,056 | B1 * | 3/2011 | Brassem ................ H04L 47/10 370/230.1 |
| 8,132,000 | B2 * | 3/2012 | Lebovitz ............... H04L 12/185 370/239 |
| 2008/0288458 | A1 * | 11/2008 | Sun ..................... H04L 67/1097 |
| 2009/0234968 | A1 * | 9/2009 | Thomas ............. H04L 65/4084 709/241 |
| 2012/0147885 | A1 * | 6/2012 | Johri ................... H04L 12/1854 370/390 |

* cited by examiner

*Primary Examiner* — Yemane Mesfin
*Assistant Examiner* — Abdelillah Elmejjarmi
(74) *Attorney, Agent, or Firm* — Maschoff Brennan

(57) ABSTRACT

A method for routing a multicast stream is disclosed. The method comprises providing an overlay network comprising at least one controller; and a plurality of routers communicatively coupled to the at least one controller; receiving by the controller, multicast control information from each of the plurality of routers; creating by the controller, a routing tree based on the multicast control information; receiving by a first router, a request to join a multicast stream from a first receiver; locating a route to a replication point for the stream within the overlay network based on the routing tree; creating a secure communications path between the first router and the replication point over a unicast transport network; receiving, by the first receiver, a multicast stream from the replication point via the secure communications path; and de-encapsulating the multicast stream and forward it to the first receiver.

22 Claims, 9 Drawing Sheets

MULTICAST ROUTING BASED ON A UNICAST TRANSPORT NETWORK

FIELD

Embodiments of the present invention relate to methods and systems for multicast routing.

BACKGROUND

Multicast routing is gaining acceptance as a technology for distributing content. With multicast routing a multicast tree is used to connect a source with receivers and data is sent across the multicast tree towards receivers. Data is not copied at the source, but rather, inside the network at distribution branch points. Only a single copy of data is sent over links that lead to multiple receivers, resulting in bandwidth saving. Multicast packets are replicated in the network at the point where paths diverge by routers enabled with Protocol Independent Multicast (PIM), and other supporting multicast protocols. Unlike broadcast, the traffic is only received and processed by devices that are listening for it.

Thus, multicast routing is a bandwidth-conserving technology that reduces traffic by simultaneously delivering a single stream of information to potentially thousands of subscribers.

Two multicast service models are deployed today:

(a) Any Source Multicast (ASM) where an interested receiver of a multicast session notifies the network via Internet Group Management Protocol (IGMP) that it is interested in joining a specific group associated with that multicast session. The receiver then receives content sent by any source sending to this group. This model is targeted to support dynamic multi-source sessions for different applications, e.g. for conferencing and financial trading. The standard protocol set in support of ASM is IGMPv2 or IGMPv3 for hosts to join a group and Protocol Independent Multicast-Sparse Mode (PIM-SM), together with Multicast Source Discovery Protocol (MSDP), for inter-domain operations and rendezvous point (RP) redundancy; and (b) Source Specific Multicast (SSM) where an interested receiver of a multicast session specifies both the group and the source (or sources) from which it would like to receive content. The SSM model is achieved through the use of IGMPv3 which allows the host to specify both the group and the sources of interest, as well as the PIM-SSM which generates S, G joins.

SUMMARY

According to a first aspect of the invention, there is provided a method for routing a multicast stream. The method comprises providing an overlay network comprising at least one controller; and a plurality of routers communicatively coupled to the at least one controller; receiving by the controller, multicast control information from each of the plurality of routers; creating by the controller, a routing structure based on the multicast control information; receiving by a first router, a request to join a multicast stream from a first receiver; locating a route to a replication point for the stream within the overlay network based on the routing tree; creating a secure communications path between the first router and the replication point over a unicast transport network; receiving, by the first receiver, a multicast stream from the replication point via the communications path; and de-encapsulating the multicast stream and forward it to the first receiver.

According to a second aspect of the invention, there is provided a computer-implemented method, comprising: performing a registration operation to register a plurality of multicast-enabled routers for routing a multicast stream from a source; tracking replication points for the multicast stream from the source s, each replication point corresponding to a router of the plurality of multicast-enabled routers; receiving a request for a replication point for the multicast stream from a first router of the plurality of routers; responsive to the request for the replication point, performing a selection operation to select at least one replication point for said multicast stream from the tracked replication points, each selected replication point corresponding to second router of the plurality of routers; and providing each selected replication point to said first router.

Other aspects of the invention will be apparent from the detailed description below.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose techniques for extending native multicast routing to include transport networks that do not support multicast routing as a delivery channel. An example of such a public transport network includes the Internet. As will be explained, the techniques utilize an overlay network provisioned with a routing structure to facilitate the multicast routing. In one embodiment the routing structure may include a secure optimized multicast routing tree. Advantageously, distribution of content thorough the transport network occurs without ingress replication.

Figure 1:
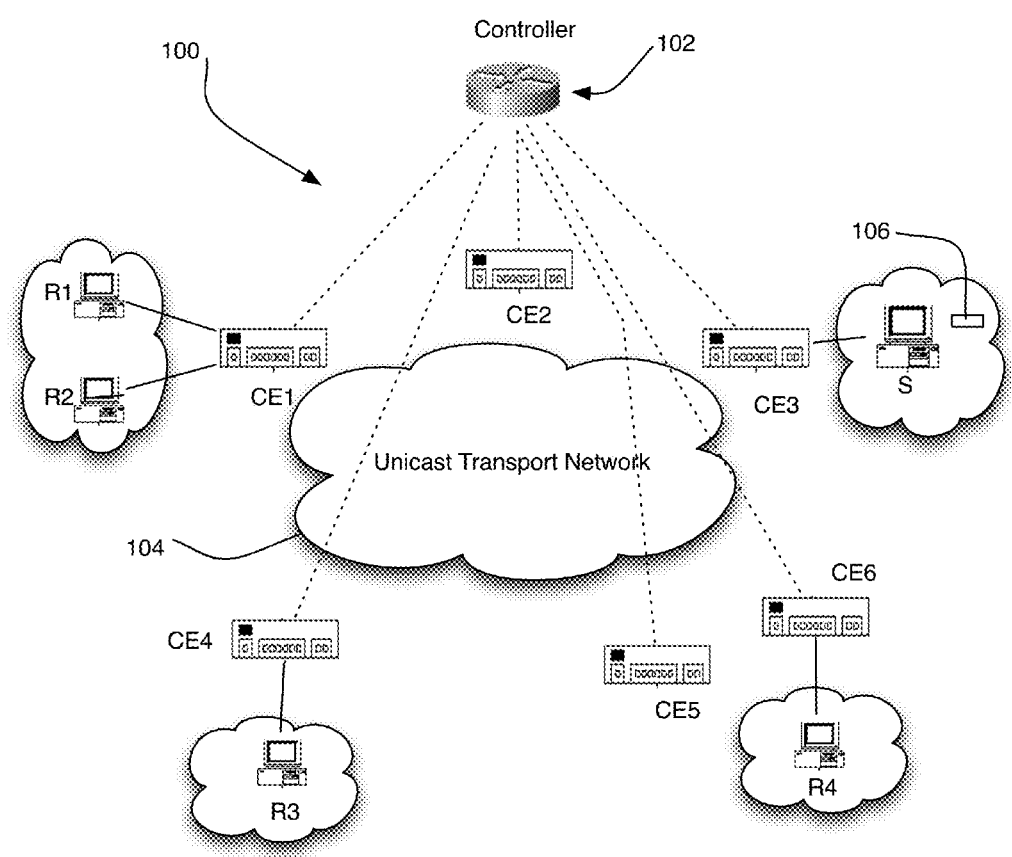
FIG. 1 shows an exemplary deployment scenario comprising an overlay network for multicast routing over a public transport network, in accordance with one embodiment of the invention.

FIG. 1 shows a deployment scenario for routing multicast content corresponding to a multicast group G from a source S to a plurality of receivers R1 to R4, in accordance with one embodiment of the invention. To facilitate the multicast routing, the deployment scenario includes an overlay network 100. Components of the overlay network 100 include a controller 102, and a plurality of customer edges/routers. The customer edges may be multicast-enabled routers. In FIG. 1, only six customer edges indicated as CE1 to CE6 are shown, however it is to be understood that different deployments may include a different number of customer edges. The customer edges CE1 to CE6 are connected to a plurality of receivers, only four of which have been shown in FIG. 1 as R1 to R4.

The controller 102 orchestrates multicast routing using a unicast transport network 104 as a delivery network, as will be explained. The unicast transport network 104 is a network that does not provide native support for multicast routing. The network 104 may be public or private and in one embodiment may be defined by the Internet.

Figure 2:
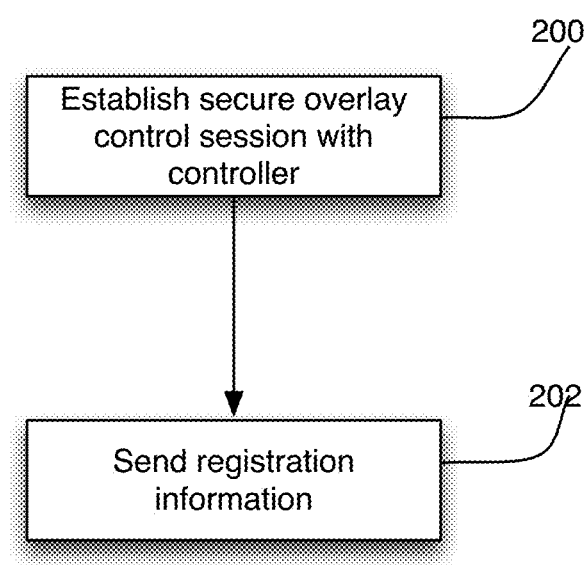
FIG. 2 shows processing blocks for a registration operation performed by a router in accordance with one embodiment of the invention.

Each of the routers CE1 to CE6 are configured to execute a registration operation, e.g. upon power on or boot-up. FIG. 2 shows the processing blocks for the registration operation, in accordance with one embodiment. Referring to FIG. 2, at block 200, the router establishes a secure overlay control session with the controller 102. The session may be established using a secure protocol such as SSL/TLS or IPSec, as will be understood by one of ordinary skill in the art. At block 202, the router sends registration information to the controller 102. The registration information may include a location/address of the router, service prefixes, and one or more multicast attributes (also referred to herein as "multicast control information") of the router. In one embodiment, the multicast attributes may include:

(a) An indication of whether the router is capable of multicast replication;

(b) The maximum number of multicast replications allowed. In other words, how many multicast streams the router can replicate out to a wide area network (WAN)/transport side;

(c) Carrier information, AT&T, Verizon, Comcast etc. that specifies the transport carrier that provides WAN/transport network connectivity to the router (d) The maximum multicast outgoing traffic on WAN/transport link. In one embodiment, the maximum multicast outgoing traffic may be expressed as a percentage of the total bandwidth of the router that can be used for multicast traffic.

In one embodiment, the overlay network 100 may support PIM SSM as a service model for delivery of multicast content through the unicast network 104, as will now be explained.

To begin, assume that the receiver R1 sends a PIM SSM or IGMPv3 join request (s,g) to the router CE1. Responsive to the join request, the router CE1 creates an interface (s,g)→R1. The router CE1 sends a control message to the controller 102 to register itself as a receiver for the (s,g) in the join request. The control message may also include a query for "s".

Responsive to the control message, the controller 102 responds with the location of "s", i.e. the location of the router CE3. The location of "s" may be specified as an address within the unicast transport network 104. In one embodiment, the location of the router CE3 may be specified as part of an instruction from the controller 102 to the router CE1 to send a join request to the router CE3.

The router CE1 may send a join request (s,g) to the router CE3. This join request may be sent as an encapsulated message over a secure encrypted tunnel through the network 104, in accordance with one embodiment. The creation of the secure tunnel may be facilitated by the controller 102 via the sharing of encryption keys, as one of ordinary skill in the art would appreciate.

In one embodiment, the router CE1 may send a control information in the form of a notification message to the controller 102 to notify the controller 102 of the join (s,g) request that it sent to the router CE3. This enables the controller 102 to track each router that is actively receiving the multicast stream in the overlay network.

Responsive to receiving the encapsulated message from CE1, the router CE3 de-encapsulates the message and programs the interface (s,g) to CE1. The router CE3 also sends the PIM join message towards the source.

At this point, the router CE3 starts receiving the stream for (s,g) from the source S. The router CE3 encapsulates the stream to the router CE1 via the tunnel between CE1 and CE3 that was setup through the network 104. The router CE1 forwards the stream to the receiver R1

Figure 3:
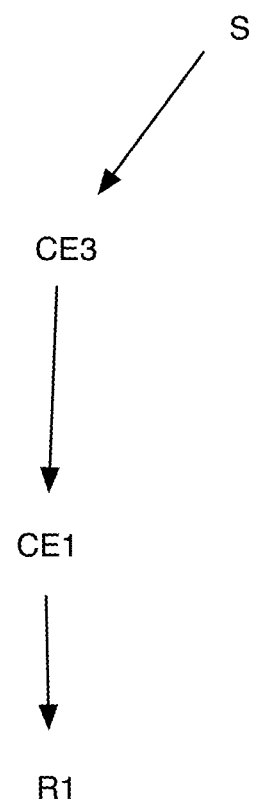
FIGS. 3-5 show examples of routing trees created by a controller, in accordance with one embodiment of the invention.

The controller 102 stores a multicast tree for (s,g). At this point the tree includes a path from S to R1 as is shown in FIG. 3.

Now assume that the receiver R3 sends a join request (s,g) to the router CE4. The router CE4 responds by creating an interface: (s,g)→R3. The router CE4 registers itself as a receiver for (s,g) with the controller 102, and queries the controller 102 for location information pertaining to a source for (s,g). In one embodiment, registration of the router CE4 as a receiver for the multicast stream (s,g) may be achieved by the router CE4 sending a control message to notify the controller 102 that it is a receiver for the stream (s,g). The control message may be realized by simply forwarding a copy of the join (s,g) message sent to CE4 to the controller 102.

It is to be noted that all communications (control messages) between the controller 102 and each of the routers CE are via the secure overlay control session.

The controller 102 performs a selection process to select at least one replication point for (s,g). For illustrative purposes, consider that the controller 102 selects the routers CE3 and CE1 as replication points or replicators. Information on the replicators is provided to the router CE4 via a control message from the controller 102 to the router CE4. Since the control message included more than one replicator, the router CE4 may perform a probing operation to select a replication point form which to obtain the multicast stream G. In one embodiment, the probing operation may include sending a probe/message to each of the replicators provided by the controller 102 to identify the closest replicator to CE4, based on round trip delays, in accordance with one embodiment. In some embodiments, the probes/messages may be extended to measure other things such as latency, jitter, etc.

Figure 4:
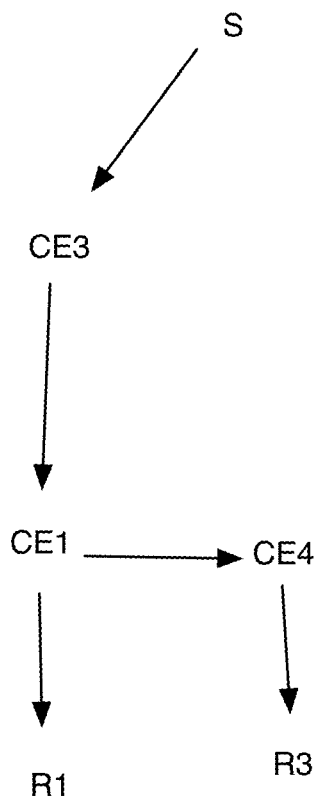

Assume that through the probe, it is discovered that the replicator CE1 is closer to CE4 than the replicator CE3. In this case, the router CE4 may send a join (s,g) message to the router CE1 since it is the closest router to CE1. Responsive to the join (s,g) message, the router CE1 creates the interface (s,g)→CE4 and encapsulates the stream G to CE4 via a secure tunnel through the network 104. As noted above, the creation of the secure tunnel between CE4 and CE1 may by facilitated by the controller 102 by the provision of encryption keys. At this point the routing table for (s,g) is as is shown in FIG. 4.

Figure 5:
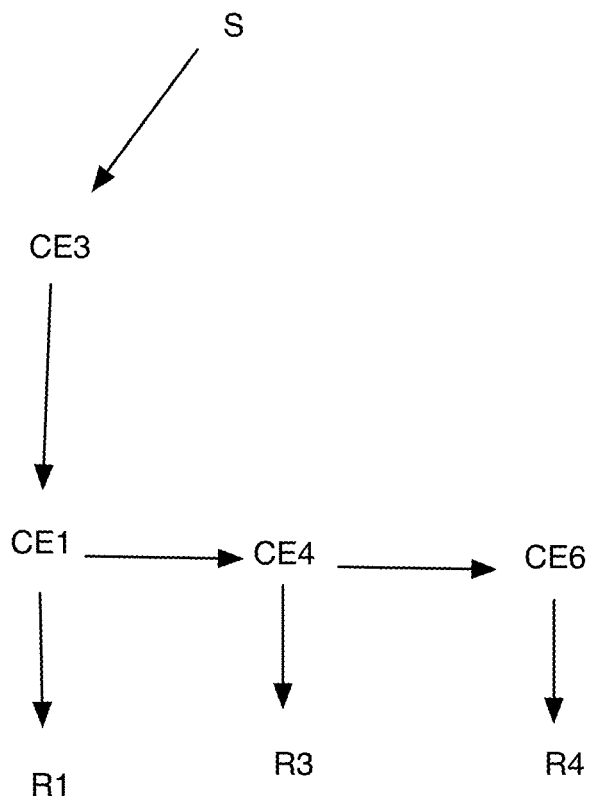

Now assume that the receiver R4 comes up and wishes to join the multicast stream G corresponding to (s,g). R4 will send a join request for (s,g) to the router/edge CE6. CE6 will respond to the join s,g) request as described above in connection with the routers CE1 and CE4. Assume further, the controller 102 provides CE1, CE3, and CE4 as a list of possible replicators to CE6. If, based on probes to CE1, CE3, and CE4, the router CE6 discovers that CE4 is the closest replicator then a tunnel will be established between CE6 and CE4 for the purpose of sending the stream G from CE4 to CE6 in encrypted form, as described. At this point the routing table for (s,g) that is maintained by the controller 102 will be as shown in FIG. 5.

Figure 6:
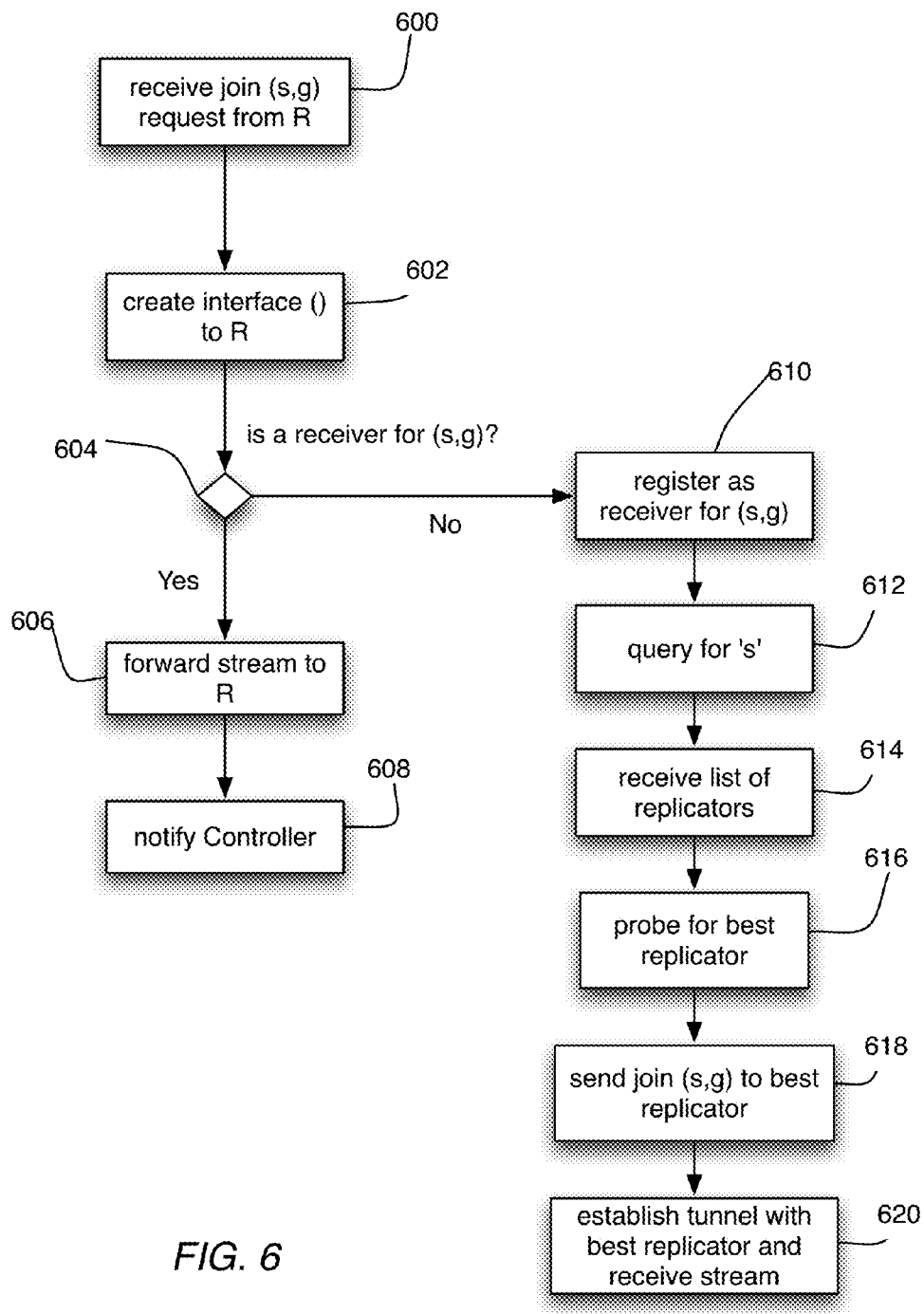
FIG. 6 shows processing blocks for a router, in accordance with one embodiment of the invention.

As has been shown, each customer edge or router CE is responsible for locating a route to an upstream source responsive to receiving a join (s,g) message to a downstream receiver. Particular examples of the processing by a CE in order to service a join (s,g) message have been provided from the points of view of CE1, CE4, and CE6. In general terms, the processing by a customer edge or router CE may include the processing blocks shown in the flowchart of FIG. 6, which includes:

Block 600 wherein a join (s,g) is received from a connected receiver R;

Block 602 wherein an interface to the receiver R i.e. (s,g)→R is created.

Block 604 wherein a check is made to determine if the CE is already a receiver for the stream G corresponding the (s,g) contained in the join (s,g) request;

Block 606 wherein the stream for G is forwarded to the R if the CE is already a receiver for the stream G.

Block 608 wherein the CE sends a control message to the controller to notify the controller that it is forwarding the stream G to the receiver R.

Block 610 wherein, if the CE is not already a receiver for the stream G, the CE registers with the controller as a receiver for the stream G. This may be achieved, in one embodiment via a registration control message sent from the CE to the controller using the secure overlay control session the source "s" associated with the join (s,g) request.

Block 612 wherein the CE sends a query to the controller for the location of the source S for the corresponding the join (s,g) request.

Block 614 wherein the CE receives a list of possible replicators for the stream G corresponding to the join (s,g) request.

Block 616 wherein the CE upon receiving the list of possible replicators executes a probing operation to probe for the best replicator. In one embodiment, the best replicator may be the one that is closest to the CE, e.g. as measured by round trip response times for a probe message sent each of the replicators.

Block 618 wherein the CE sends join request to the best replicator.

Block 620 wherein a secure encrypted channel or tunnel is established with the best replicator. This may be achieved based on encryption keys provided by the controller 102. The stream G may be received via the tunnel whereupon the CE de-encapsulates the stream and forwards it to R.

Figure 7:
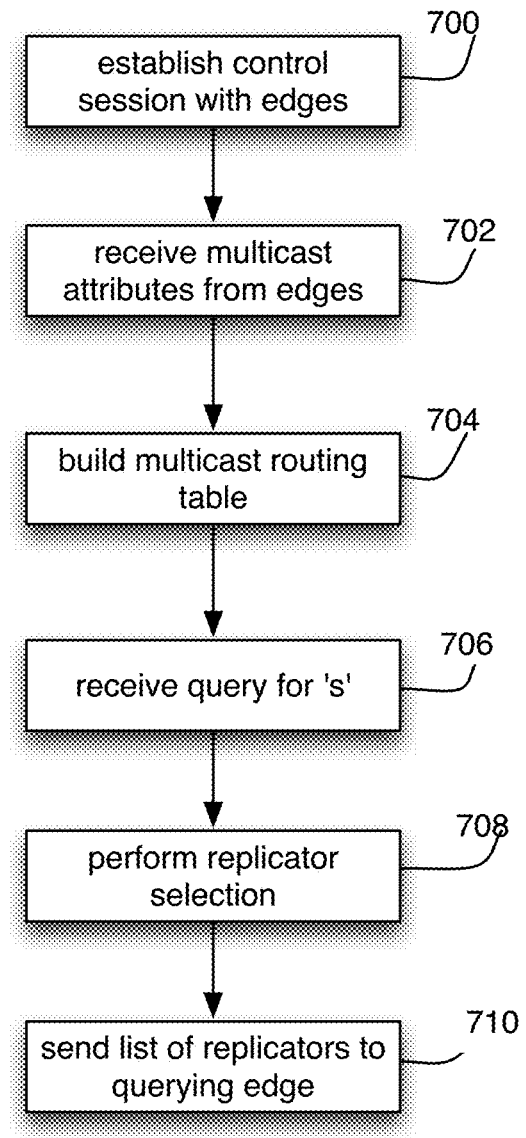
FIG. 7 shows processing blocks for a controller, in accordance with one embodiment of the invention.

As has already been described, the controller 102 is responsible for controlling operations of each of the customer edges within the overlay network 100. The controller 102 is also responsible for maintaining the topology of the overlay network within a routing structure. In one embodiment, the routing structure may include a secure optimized routing tree to enable multicast routing over a unicast transport network, as described above. FIG. 7 shows the operations of the controller 102 at a high-level in accordance with one embodiment.

Referring to FIG. 7 operations of the controller 102 may include:

Block 700 wherein a control session is established with the routers or customer edges (CE1 to CE 6 in FIG. 1). As noted this may be achieved by using a secure protocol such as SSL/TLS or IPSec.

Block 702 wherein multicast attributes for each router is received.

Block 704 wherein the controller 102 builds a multicast routing table based on interfaces reported by the routers (CE1 to CE6 in FIG. 1).

Block 706 wherein the controller 102 receives a query for a source 's' corresponding to a join (s,g) request from a router.

Block 708 wherein the controller 102 performs a replicator selection process to select at least one replication to provide to a router in response to having received a query for 's' from the router at block 706.

Block 710 wherein the controller 102 sends the list of replicators to the querying router or edge.

One embodiment of how the controller selects the list of best replicators to provide to a querying edge/router will now be described. It is to be noted that the controller 102 maintains a list of all registered routers/edges for a given (s,g). Further, the controller 102 maintains the multicast attributes for each router. These multicast attributes have been described earlier.

With this information the controller may execute an algorithm to select the best replicators as follows:

IF
  (candidate router/edge is multicast capable) and
  (has not reached maximum replications) and
  (has not exceeded maximum allowed multicast bandwidth)
THEN
  (send to the querying router/edge as a potential replicator in response to the query)
IF (there are multiple replicators that meet the above criteria)
THEN
  (if router/edge is replicator's transport carrier)

THEN
    (Mark that candidate with a higher priority in the list of possible replicators)

Thus far, the PIM SSM service model has been described. Embodiments of the invention also support the PIM ASM service model where the source is not known to a receiver. In accordance with the PIM ASM service model, the receiver R1 may send a (*,G1) join request to the router CE1. CE1 responds by sending a query to the controller 102. The controller 102, which as been configured with the address of a rendezvous point (RP) 106, sends back the transport location address for the RP 106. The router CE1 then sends a (*,g1) join to the RP 106 using the transport location address. A secure tunnel may thus be established between CE1 and the RP 106 over the network 104. CE1 may then start receiving an encapsulated stream from the RP 106 via the tunnel. CE1 de-encapsulates the stream and forwards it the R1.

If CE1 is the first hop router and needs to switch to the shortest path tree (SPT) then CE 1 sends a (s, g1) join request to the controller 102. The controller 102 is configured to respond with the transport location addresses of potential replicators (CE3 in the case of FIG. 1). The router CE1 then sends a (s,g1) join request to the router CE3 via a secure tunnel thorough the network 104. CE1 starts receiving the stream G from CE3 via the tunnel. CE1 de-encapsulates the stream and forwards it to the receiver R1. Now if say the receiver R3 sends a (*,g1) join request to the router CE4, CE4 will send a query to the controller 102 for the RP associated with the (*,g1) join request. The controller 102 will respond by sending the transport location address for the router (CE3) to reach the RP 106. CE4 will then establish a tunnel to CE3 and starts receiving the multicast stream G from CE3 via the tunnel. In one embodiment, CE4 will also send a control message to the controller 102 to notify the controller that it is a receiver for the stream from CE3. CE4 will de-encapsulate the stream and forward it to the receiver R3.

If the router CE 4 needs to switch to the SPT then it will send a (s,g1) join request to the controller 102. Responsive to the latter join request, the controller 102 will provides the transport location addresses for CE1 and CE3. If the router CE4 decides to join the router CE1, for example because of the results of the above-described probing operation then a (s,g1) join request is sent from CE4 to CE1. A tunnel will be established between the end points CE4 and CE1. Encapsulated stream traffic will be received by CE4 from CE1 via the tunnel. The router CE4 will de-encapsulate the stream and forward it to the receiver R3.

Advantageously, in one embodiment, routing information maintained by the controller 102 is kept sparse by pruning as will now be described.

In one embodiment, if a CE receives a prune from the service side for a multicast group (s,g) or (*,g) or (*, g, rpt), then the CE checks if there is any outgoing interface (oif) for the multicast domain referenced in the prune.

If an oif exists, then the CE prunes the interfaces for the multicast group on the service side it received the prune from, but does not propagate the prune to any upstream CEs/routers or the controller 102 in overlay domain, in accordance with one embodiment.

If there is no receiver in either the service domain or the overlay domain then the CE sends the prune to both the upstream CE it is receiving the stream for the multicast group from and to the controller 102 so that the oif may be removed from multicast routing structure (tree) maintained by the controller 102.

If the controller 102 receives a prune from a CE, the controller may respond by removing the sending CE's corresponding entry from its routing structure thereby essentially removing the CE from the multicast topology. In one embodiment, it is assumed that the sending CE is not replicating the multicast stream to any other CE since the sending CE is configured to not send a prune to the controller 102 until its oif table is empty.

Figure 8:
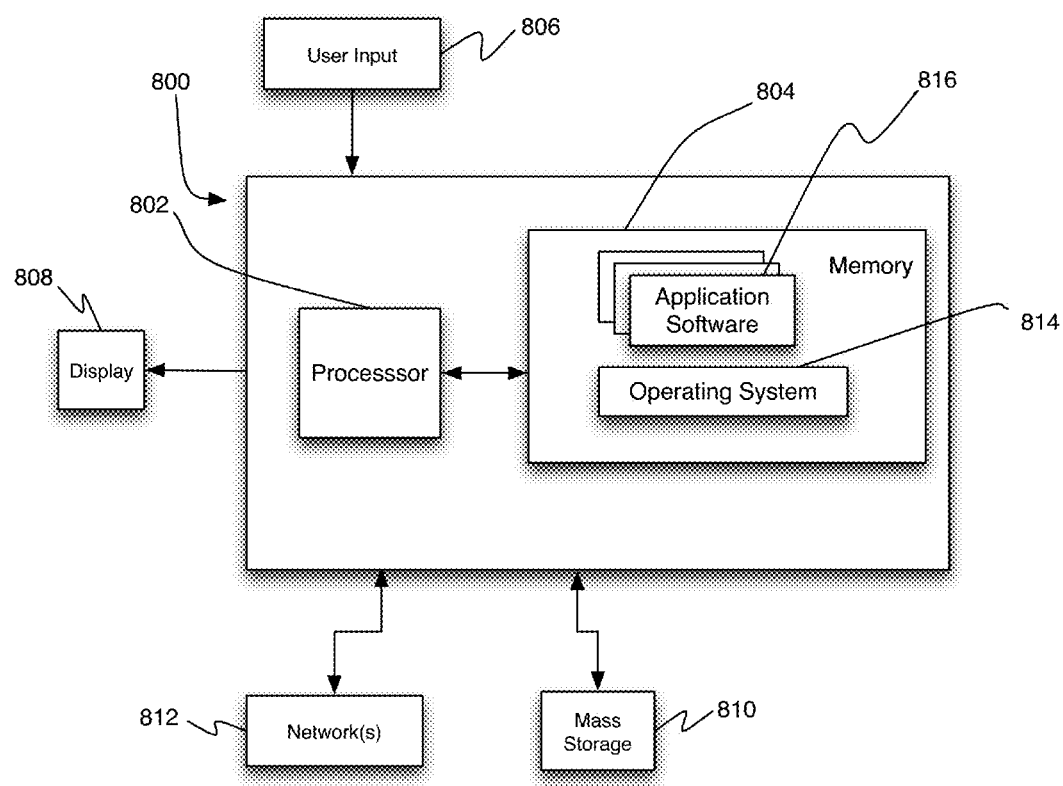
FIG. 8 shows as high-level block diagram of hardware for a controller, in accordance with one embodiment of the invention.

FIG. 8 shows an example of hardware 800 that may be used to implement the controller 102 in FIG. 1. The hardware 800 may includes at least one processor 802 coupled to a memory 804. The processor 802 may represent one or more processors (e.g., microprocessors), and the memory 804 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 804 may be considered to include memory storage physically located elsewhere in the hardware, e.g. any cache memory in the processor 802, as well as any storage capacity used as a virtual memory, e.g., as stored on a mass storage device.

The hardware also typically receives a number of inputs and outputs for communicating information externally. For interface with a user or operator, the hardware may include one or more user input output devices 806 (e.g., a keyboard, mouse, etc.) and a display 808. For additional storage, the hardware 800 may also include one or more mass storage devices 810, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 812 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 802 and each of the components, as is well known in the art.

The hardware 800 operates under the control of an operating system 814, and executes application software 816 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 9:
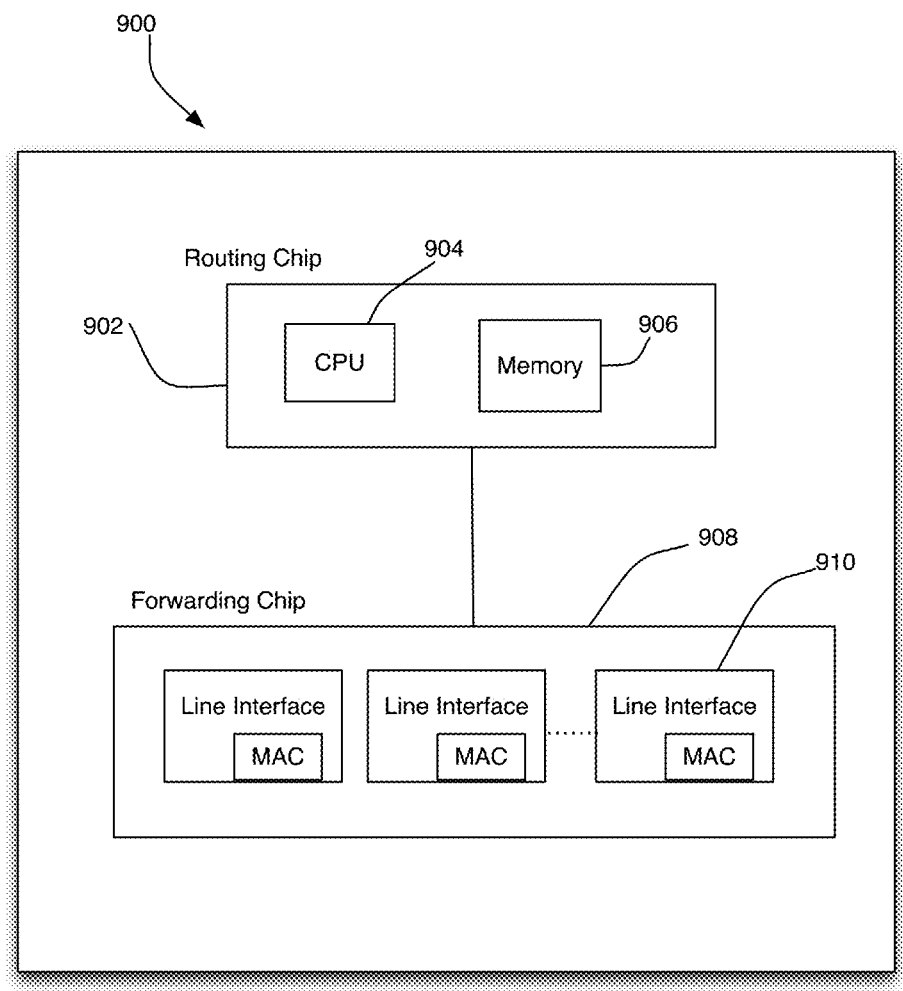
FIG. 9 shows a high-level block diagram of hardware for a router, in accordance with one embodiment of the invention.

FIG. 9 shows a block diagram of hardware 900 for a router (CE1 to CE6), in accordance with one embodiment of the invention. Referring to FIG. 9, the hardware 900 includes a routing chip 904 coupled to a forwarding chip 908. The routing chip 904 performs functions such as path computations, routing table maintenance, and reachability propagation. Components of the routing chip include a CPU or processor 904 which is coupled to a memory 906. The memory stores instructions to perform the methods disclosed herein. The forwarding chip is responsible for packet forwarding along a plurality of line interfaces 910.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for routing a multicast stream, comprising:
providing an overlay network comprising at least one controller, and a plurality of multicast-enabled routers communicatively coupled to the at least one controller;
receiving, by the controller, multicast control information from each of the plurality of multicast-enabled routers;
tracking, by the controller, replication points for the multicast stream from a source of the multicast stream, each replication point corresponding to a router of the plurality of multicast-enabled routers;
creating, by the controller, a routing structure based on the multicast control information and the replication points;
receiving, by the controller from a first router of the plurality of multicast-enabled routers, a request for a replication point for the multicast stream, the request generated in response to a request from a first receiver to the first router of the plurality of multicast-enabled routers to join the multicast stream;
processing, by the controller, the request for the replication point by performing a selection operation to select at least one replication point for the multicast stream from the tracked replication points, each selected replication point corresponding to a second router of the plurality of multicast-enabled routers, wherein performing the selection operation includes sending a probe message to each replication point of the tracked replication points to identify at least one closest replicator to the first router of the plurality of multicast-enabled routers based on round trip delays;
transmitting, by the controller to the first router of the plurality of multicast-enabled routers, each selected replication point for the multicast stream;
creating a communications path between the first router of the plurality of multicast-enabled routers and each of the selected replication points over a unicast transport network;
receiving, by the first router of the plurality of multicast-enabled routers, an encapsulated multicast stream from the selected replication point via the communications path; and
de-encapsulating, by the first router of the plurality of multicast-enabled routers, the received encapsulated multicast stream and forwarding the de-encapsulated multicast stream to the first receiver.

2. The method of claim 1, wherein the routing structure comprises a routing tree.

3. The method of claim 1, wherein the communications path comprises a secure communications path.

4. The method of claim 1, wherein performing the selection operation comprises identifying a router from a list of routers as the router that is identified as closest to the first router based on a probe.

5. A computer-implemented method, comprising:
performing, by a controller, a registration operation to register a plurality of multicast-enabled routers for routing a multicast stream from a source of the multicast stream, including receiving multicast control information from each of the plurality of multicast-enabled routers;
tracking, by the controller, replication points for the multicast stream from the source of the multicast stream, each replication point corresponding to a router of the plurality of multicast-enabled routers;
creating, by the controller, a routing structure based on the multicast control information and the replication points;
receiving, by the controller, a request for a replication point for the multicast stream from a first router of the plurality of multicast-enabled routers, the request generated in response to a request from a first receiver to the first router of the plurality of multicast-enabled routers to join the multicast stream;
responsive to the request for the replication point, performing a selection operation, by the controller, to select at least one replication point for the multicast stream from the tracked replication points, each selected replication point corresponding to a second router of the plurality of multicast-enabled routers, wherein performing the selection operation includes sending a probe message to each replication point of the tracked replication points to identify at least one closest replicator to the first router of the plurality of multicast-enabled routers based on round trip delays; and
providing, by the controller, each selected replication point to the first router of the plurality of multicast-enabled routers;
creating a communications path between the first router of the plurality of multicast-enabled routers and each of the selected replication points over a unicast transport network;
receiving, by the first router of the plurality of multicast-enabled routers, an encapsulated multicast stream from the selected replication point via the communications path; and
de-encapsulating, by the first router of the plurality of multicast-enabled routers, the received encapsulated multicast stream and forwarding the de-encapsulated multicast stream to the first receiver.

6. The method of claim 5, wherein performing the selection operation comprises selecting a plurality of the replication points, and providing each selected replication point comprises providing the plurality of selected replication points to the first router.

7. The method of claim 6, wherein providing the plurality of selected replication points comprises providing a transport location address for each selected replication point within a unicast transport network.

8. The method of claim 6, further comprising providing encryption keys to the first router to enable creation of a secure tunnel between the first router and each of the selected replication points over a unicast transport network.

9. The method of claim 5, wherein tracking the replication points comprises creating a multicast routing tree to track each replication point for the multicast stream.

10. The method of claim 9, further comprising periodically receiving multicast control information from each of the plurality of multicast-enabled routers; and updating the multicast routing tree based on the multicast control information.

11. A non-transitory computer-readable medium having stored thereon, a sequence of instructions which when executed by a controller, causes the controller to perform operations, the operations comprising:
  performing a registration operation to register a plurality of multicast-enabled routers for routing a multicast stream from a source of the multicast stream, including receiving multicast control information from each of the plurality of multicast-enabled routers;
  tracking replication points for the multicast stream from the source of the multicast stream, each replication point corresponding to a router of the plurality of multicast-enabled routers;
  creating, by the controller, a routing structure based on the multicast control information and the replication points;
  receiving a request for a replication point for the multicast stream from a first router of the plurality of multicast-enabled routers, the request generated in response to a request from a first receiver to the first router of the plurality of multicast-enabled routers to join the multicast stream;
  responsive to the request for the replication point, performing a selection operation to select at least one replication point for the multicast stream from the tracked replication points, each selected replication point corresponding to a second router of the plurality of multicast-enabled routers, wherein performing the selection operation includes sending a probe message to each replication point of the tracked replication points to identify at least one closest replicator to the first router of the plurality of multicast-enabled routers based on round trip delays;
  providing each selected replication point to the first router of the plurality of multicast-enabled routers;
  creating a communications path between the first router of the plurality of multicast-enabled routers and each of the selected replication points over a unicast transport network;
  receiving, by the first router of the plurality of multicast-enabled routers, an encapsulated multicast stream from the selected replication point via the communications path; and
  de-encapsulating, by the first router of the plurality of multicast-enabled routers, the received encapsulated multicast stream and forwarding the de-encapsulated multicast stream to the first receiver.

12. The non-transitory computer-readable medium of claim 11, wherein performing the selection operation comprises selecting a plurality of the replication points, and providing each selected replication point comprises providing the plurality of selected replication points to the first router.

13. The non-transitory computer-readable medium of claim 12, wherein providing the plurality of selected replication points comprises providing a transport location address for each selected replication point within a unicast transport network.

14. The non-transitory computer-readable medium of claim 12, wherein the operations further comprise providing encryption keys to the first router to enable creation of a secure tunnel between the first router and each of the selected replication points over a unicast transport network.

15. The non-transitory computer-readable medium of claim 11, wherein tracking the replication points comprises creating a multicast routing tree to track each replication point for the multicast stream.

16. The non-transitory computer-readable medium of claim 15, wherein the operations further comprise:
  periodically receiving multicast control information from each of the plurality of multicast-enabled routers; and
  updating the multicast routing tree based on the multicast control information.

17. A controller, comprising:
  a processor; and
  a memory coupled to the processor, the memory storing instructions which when executed by the processor causes the controller to perform operations, the operations comprising:
    performing a registration operation to register a plurality of multicast-enabled routers for routing a multicast stream from a source of the multicast stream, including receiving multicast control information from each of the plurality of multi-cast enabled routers:
  tracking replication points for the multicast stream from the source of the multicast stream, each replication point corresponding to a router of the plurality of multicast-enabled routers;
  creating, by the controller, a routing structure based on the multicast control information and the replication points;
  receiving a request for a replication point for the multicast stream from a first router of the plurality of multicast-enabled routers, the request generated in response to a request from a first receiver to the first router of the plurality of multicast-enabled routers to join the multicast stream;
  responsive to the request for the replication point, performing a selection operation to select at least one replication point for the multicast stream from the tracked replication points, each selected replication point corresponding to a second router of the plurality of multicast-enabled routers, wherein performing the selection operation includes sending a probe message to each replication point of the tracked replication points to identify at least one closest replicator to the first router of the plurality of multicast-enabled routers based on round trip delays; and
  providing each selected replication point to the first router of the plurality of multicast-enabled routers;
  creating a communications path between the first router of the plurality of multicast-enabled routers and each of the selected replication points over a unicast transport network;
  receiving, by the first router of the plurality of multicast-enabled routers, an encapsulated multicast stream from the selected replication point via the communications path; and
  de-encapsulating, by the first router of the plurality of multicast-enabled routers, the received encapsulated multicast stream and forwarding the de-encapsulated multicast stream to the first receiver.

18. The controller of claim 17, wherein performing the selection operation comprises selecting a plurality of the replication points, and providing each selected replication point comprises providing the plurality of selected replication points to the first router.

19. The controller of claim 18, wherein providing the plurality of selected replication points comprises providing a transport location address for each selected replication point within a unicast transport network.

20. The controller of claim 18, wherein the operations further comprise providing encryption keys to the first router to enable creation of a secure tunnel between the first router and each of the selected replication points over the unicast transport network.

21. The controller of claim 17, wherein tracking the replication points comprises creating a multicast routing tree to track each replication point for the multicast stream.

22. The controller of claim 21, wherein the operations further comprise:
   periodically receiving multicast control information from each of the plurality of multicast-enabled routers; and
   updating the multicast routing tree based on the multicast control information.

\* \* \* \* \*